US006506003B1

(12) United States Patent
Erickson

(10) Patent No.: US 6,506,003 B1
(45) Date of Patent: Jan. 14, 2003

(54) CUTTING TOOL

(75) Inventor: Robert A. Erickson, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/969,234

(22) Filed: Oct. 2, 2001

(51) Int. Cl.$^7$ .............................................. B23B 51/02
(52) U.S. Cl. ........................ 408/226; 408/230; 408/713
(58) Field of Search .............................. 408/144, 226, 408/230, 231, 713

(56) References Cited

U.S. PATENT DOCUMENTS

| 932,071 | A | * | 8/1909 | Urbsceeit | 408/233 |
|---|---|---|---|---|---|
| 5,863,162 | A | | 1/1999 | Karlsson et al. | |
| 5,904,455 | A | | 5/1999 | Krenzer et al. | |
| 5,957,631 | A | | 9/1999 | Hecht | |
| 5,988,953 | A | | 11/1999 | Berglund et al. | |
| 6,012,881 | A | * | 1/2000 | Scheer | 408/227 |
| 6,059,492 | A | | 5/2000 | Hecht | |
| 6,109,841 | A | * | 8/2000 | Johne | 408/144 |
| 6,276,879 | B1 | * | 8/2001 | Hecht | 409/234 |
| 2002/0159851 | A1 | * | 10/2002 | Krenzer | 408/230 |

FOREIGN PATENT DOCUMENTS

DE 2246965 9/1972

* cited by examiner

Primary Examiner—Daniel W. Howell
(74) Attorney, Agent, or Firm—Larry R. Meenan

(57) ABSTRACT

A separable rotary cutting tool is disclosed. The tool comprises a shank and a head. The shank has a receiver comprised of a shank guide at a trailing end of the receiver, opposing shank drive keys at a leading end of the receiver, and a shank locator located axially between the shank guide and the shank drive keys. The shank drive keys each comprises an axially extending shank drive key radial stop surface that is disposed at an angle relative to a plane extending through a central axis of the receiver. The head has a connector comprised of a head guide at a trailing end of the connector, opposing head drive keys at a leading end of the connector, and a head locator located axially between the head guide and the head drive keys. The head drive keys each comprises an axially extending head drive key radial stop surface that is disposed at an angle relative to a plane extending through a central axis of the connector. Each shank drive key radial stop surface is adapted to angularly align with a corresponding head drive key radial stop surface.

38 Claims, 10 Drawing Sheets

CUTTING TOOL

BACKGROUND OF THE INVENTION

1. Field of the Invention

This invention generally relates to a cutting tool and is specifically concerned with a separable end working or rotary cutting tool that is adapted to rotate to cut a stationary workpiece or that may cut a rotating work piece when stationary.

2. Description of the Related Art

Separable rotary cutting tools are known in the prior art. One such tool is described in U.S. Pat. No. 5,904,455, to Krenzer et al. This tool is described as a drill comprising an insert and body. The drill has a locating feature comprised of a groove in the body defined by two groove flanks and mating side faces on the head. The groove is slightly smaller than the insert. This results in a positive location and an interference fit between the insert and body. In operation, the insert is forced in an axial direction in the groove or drawn into the groove with a screw. In absence of a screw, the insert is predisposed to be axially displaced and thus can become axially dislodged from the groove. On the other hand, the use of a screw would require the physical size of the tool to be large enough to accompany the screw.

Other separable rotary cutting tools are described in U.S. Pat. Nos. 6,059,492 and 5,957,631, to Hecht. Both patents describe an insert and body joint. One embodiment includes two base surfaces, two torque transmission walls, and two fixation walls. The transmission and fixation walls are located between the base surfaces and adjacent to one another. The transmission walls are spaced 180 degrees apart as are the fixation walls. The fixation walls are conical or dovetail in shape and expand in a direction away from the cutting tip of the insert. The base surfaces are transverse or perpendicular from the axis of the body. A front base surface is used as the axial stop. The torque transmission walls are defined as extending in radial directions. The fixation walls are defined as having radial dimensions substantially less than the cutting diameter. Hecht also describes an embodiment comprised of a pair of base surfaces, one of which acts as an axial stop. Torque transmission walls and fixation walls are located between these base surfaces. The torque transmission walls are transverse to the axis of the fixation walls. The length of the fixation and transmission walls is about the same. The fixation walls are located further away from the tool tip than the torque transmission walls. Both of these embodiments described by Hecht have a reduced risk of becoming axially dislodged because each includes conical or dovetail shaped fixation walls. However, such walls are difficult to machine because the walls expand in a direction away from the cutting tip of the insert and into the body.

Clearly, there is a need for a separable rotary cutting tool that is not prone to inadvertent axial separation. Ideally, such a tool would be easier to manufacture and thus minimize the cost of the tool. Finally, it would be desirable if such a tool could be easily assembled.

SUMMARY OF THE INVENTION

Generally speaking, the invention is directed to a rotary cutting tool that overcomes the aforementioned shortcomings associated with the prior art. To this end, the tool of the invention comprises a shank and a head. The shank has a receiver comprised of a shank guide at a trailing end of the receiver, opposing shank drive keys at a leading end of the receiver, and a shank locator located axially between the shank guide and the shank drive keys. The shank drive keys each comprises an axially extending shank drive key radial stop surface that is disposed at an angle relative to a plane extending through a central axis of the receiver. The head has a connector comprised of a head guide at a trailing end of the connector, opposing head drive keys at a leading end of the connector, and a head locator located axially between the head guide and the head drive keys. The head drive keys each comprises an axially extending head drive key radial stop surface that is disposed at an angle relative to a plane extending through a central axis of the connector. Each shank drive key radial stop surface is adapted to angularly align with a corresponding head drive key radial stop surface.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
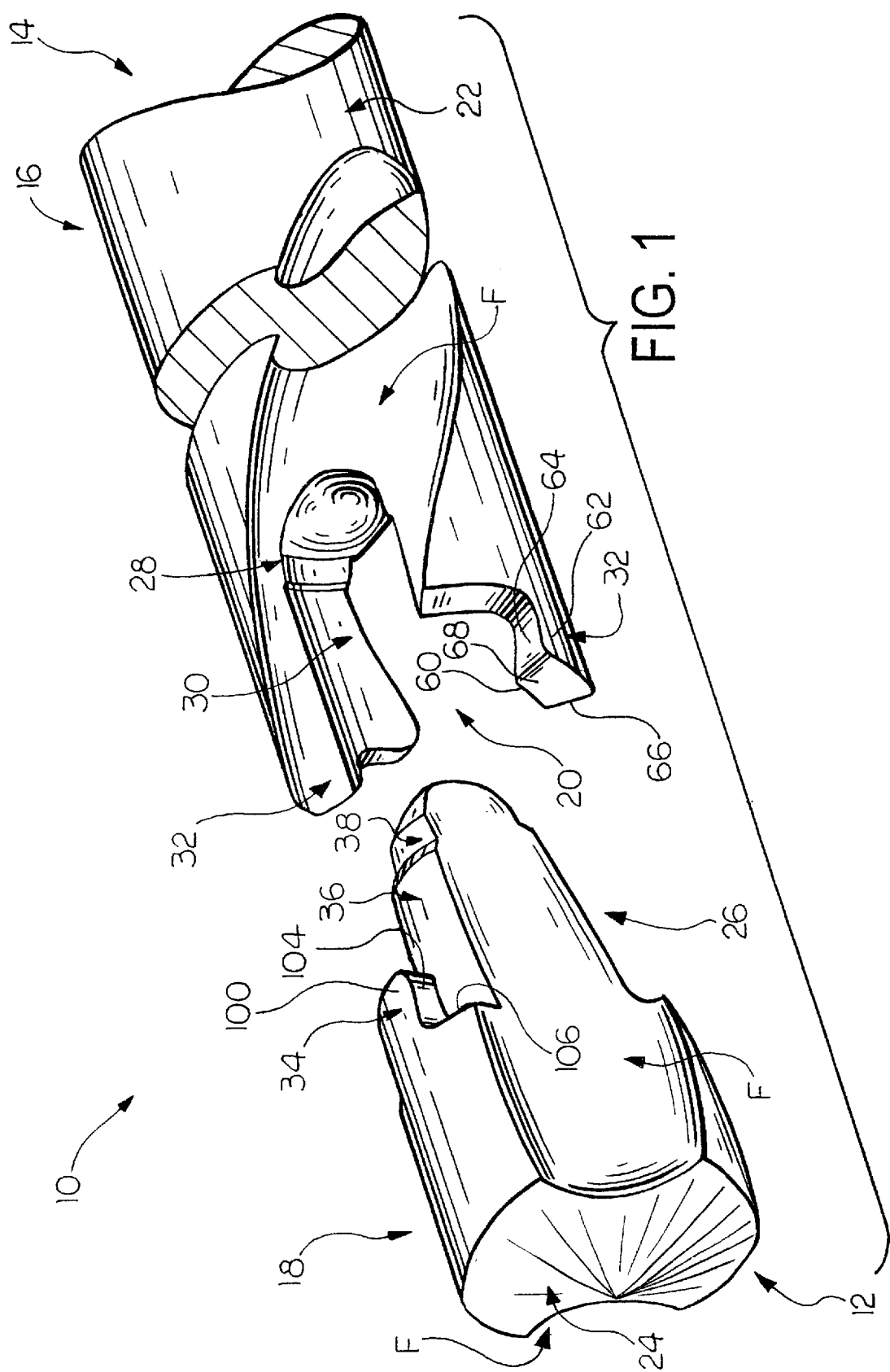
FIG. 1 is an exploded perspective view of a rotary cutting tool of the invention.
Figure 2:
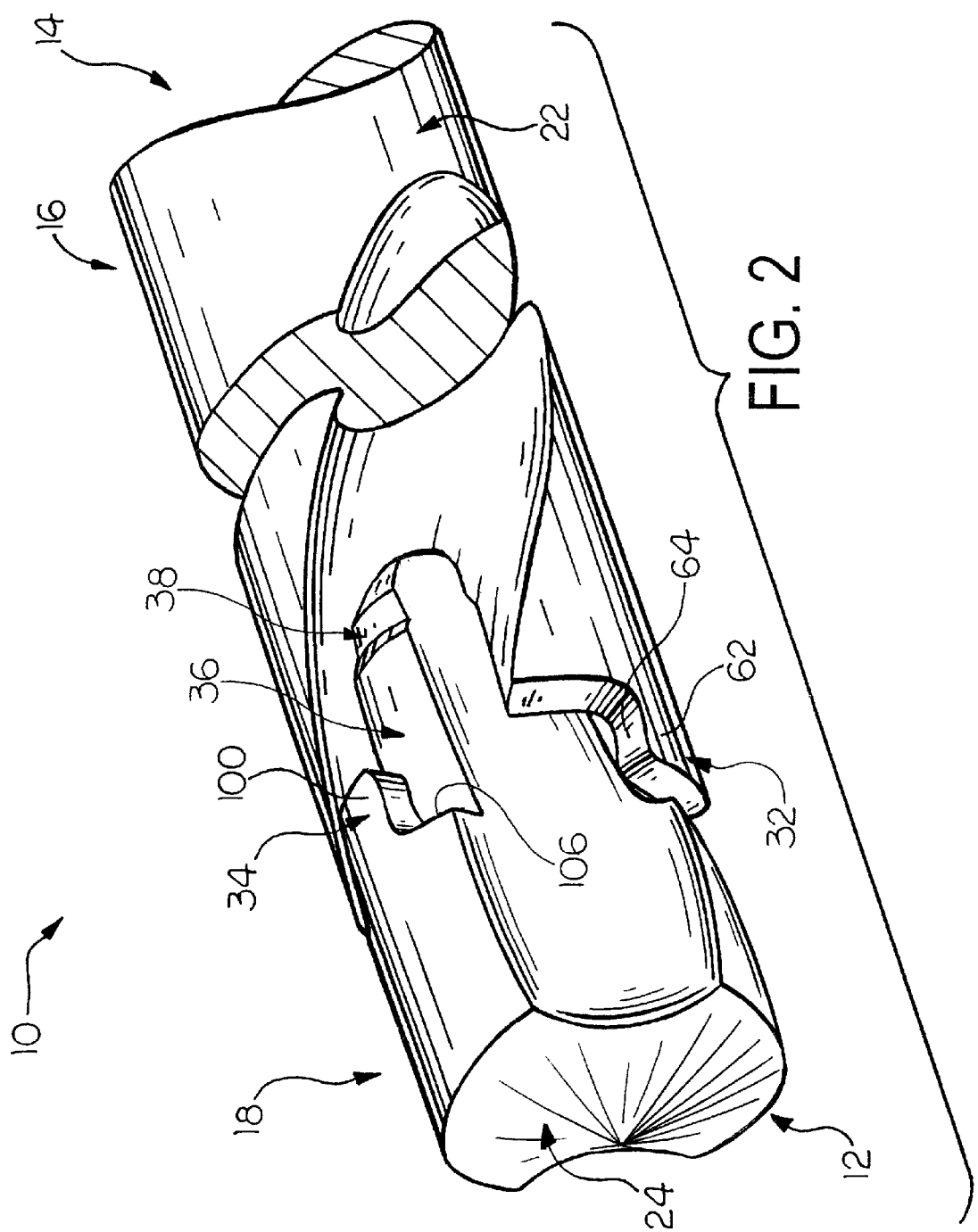
FIG. 2 is a perspective view of the rotary cutting tool shown in FIG. 1 partially assembled.
Figure 3:
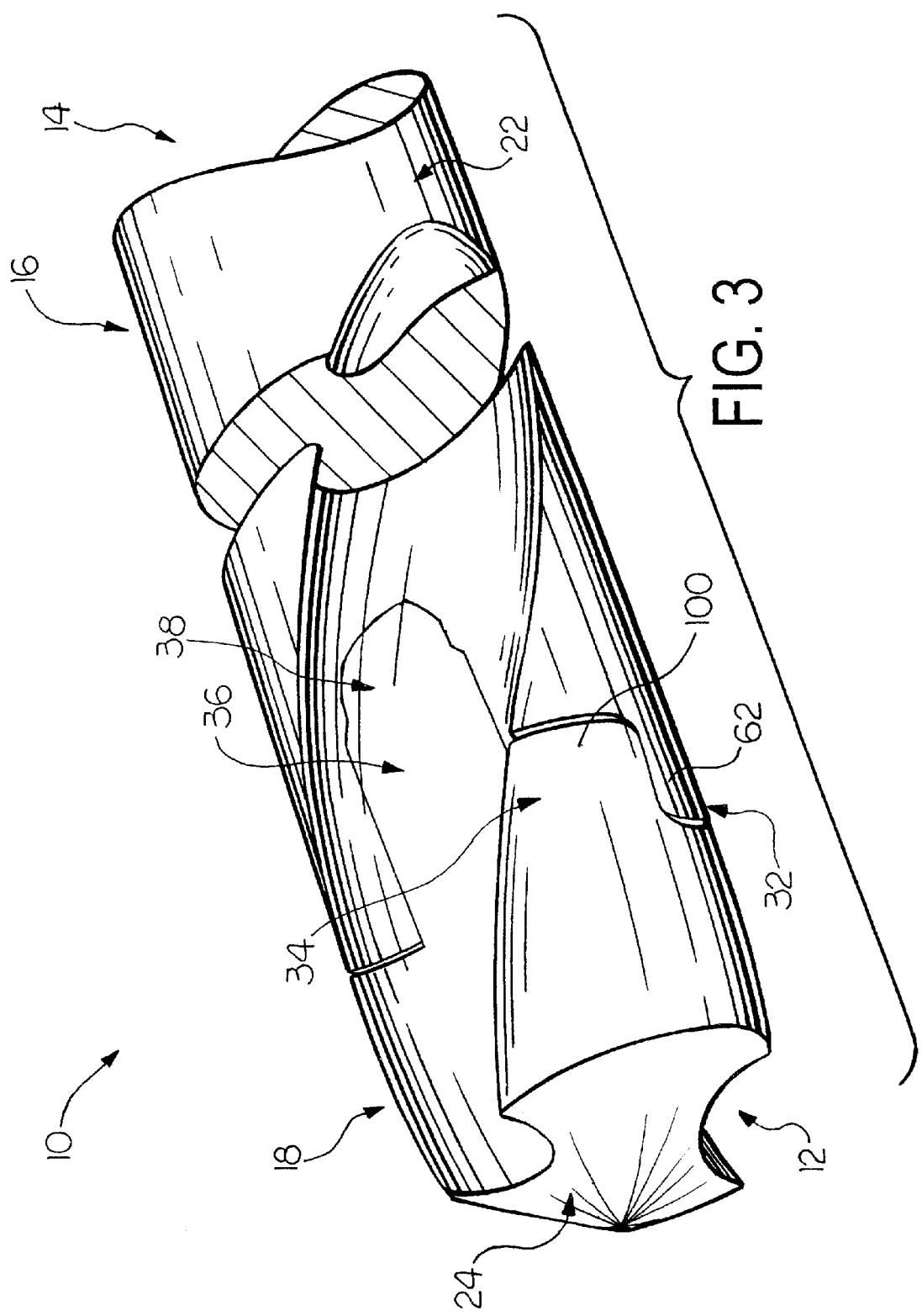
FIG. 3 is a perspective view of the rotary cutting tool shown in FIGS. 1 and 2 completely assembled.

With reference now to FIGS. 1–6, wherein like numerals designate like components throughout all of the several Figures, there is illustrated a rotary drill or tool 10 having a leading end, generally indicated at 12, and the trailing end, generally indicated at 14. The tool 10 is comprised of a body or shank 16 and an insert or head 18. The shank 16 has a receiver or receiving portion 20 at its leading end and a shank 22 at its trailing end. The head 18 has a cutting tip 24 at its leading end and a connector or mounting portion 26 at its trailing end. The mounting portion 26 cooperates with the receiving portion 20 to couple the head 18 to the shank 16.

The receiving portion 20 is comprised of a guide or shank guide portion 28, a locator or shank locating portion 30 at the leading end of the shank guide portion 28, and diametrically disposed torque or drive keys 32 (also referred to as shank drive keys) at the leading end of the shank locating portion 30. The mounting portion 26 is comprised of diametrically disposed torque or drive keys 34 (also referred to as head drive keys), a locator or head locating portion 36 at the trailing end of the head drive keys 34, and a guide or head guide portion 38 at the trailing end of the head locating portion 36.

The mounting portion 26 is adapted to be axially inserted into the receiving portion 20 until the head guide portion 38 engages the shank guide portion 28. Upon twisting the head 18, the locating portions 30 and 36 engage one another to provide an interference fit. The drive keys 32 and 34 radially engage one another to function as cooperating radial stop surfaces and drive surfaces during the operation of the tool 10.

Figure 6:
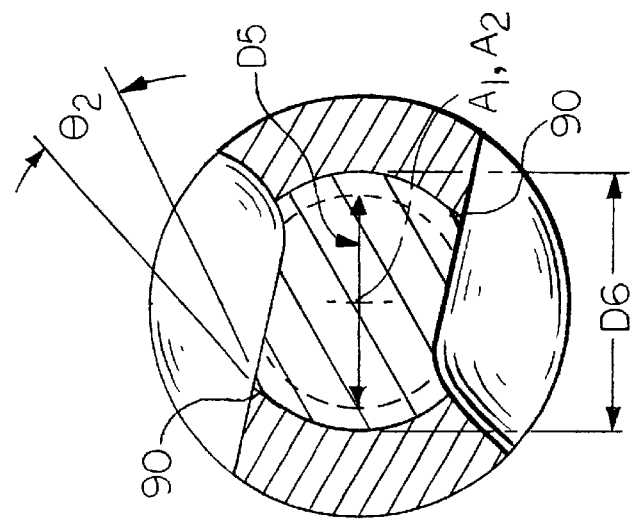
FIG. 6 is a cross-sectional view of the rotary cutting tool taken along the line 6—6 in FIG. 5.
Figure 7:
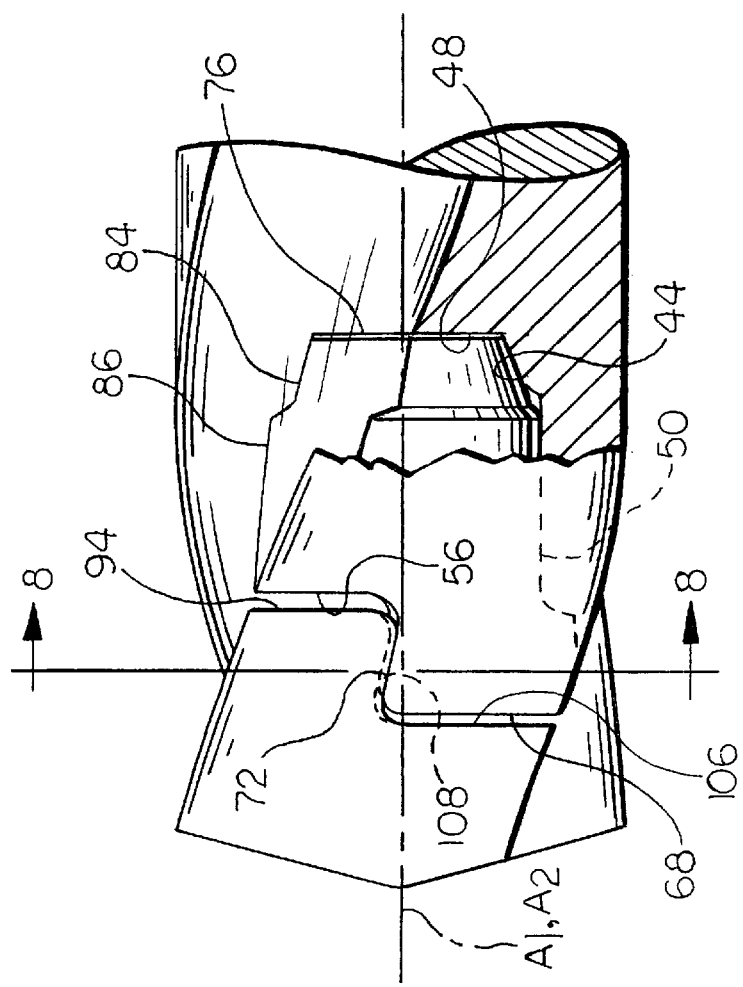
FIG. 7 is a sectional view in elevation of another rotary cutting tool of the invention.
Figure 10:
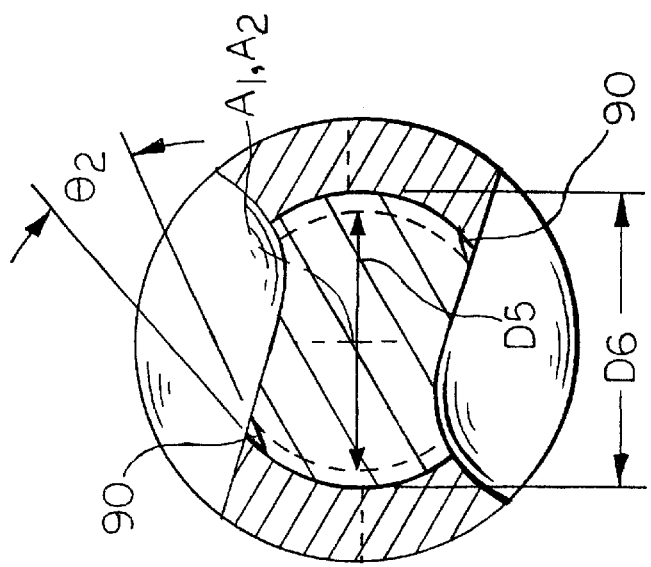
FIG. 10 is a cross-sectional view of the rotary cutting tool taken along the line 10—10 in FIG. 9.

The shank guide portion 28 is preferably defined in part by an inner cylindrical surface, such as the inner guide surface 40 shown. The inner guide surface 40 is preferably a generally straight cylindrical surface having a shank guide diameter $D_1$ (shown in FIG. 4). The shank guide portion 28 may also be provided with a generally spherical radial inner radial surface 42 adjacent its trailing end, as shown in FIGS. 1–6, or a conical inner radial surface 44, as shown in FIG. 6. In a preferred embodiment of the invention, the diameter of a conical inner radial surface 44 increases toward the leading end of the shank guide portion 28. The trailing end of the shank guide portion 28 may be defined by a first radially extending surface, which may also be referred to a radially extending shank guide surface. The first radially extending surface may be an arcuate or spherical surface 46, which may coexist with the spherical inner radial surface 42, or a generally flat surface 48, as shown in FIGS. 7, 9, 11, 13, and 15, which extends generally perpendicular to the axis $A_1$ of the shank 16. The spherical and conical inner radial surfaces 42 and 44 may function as axial stop surfaces, as shown in FIGS. 5 and 7. This holds true even if the radially extending surface is perpendicular to the shank axis $A_1$, as shown in FIGS. 9, 11, 13, and 15.

The shank locating portion 30 is preferably defined by a cylindrical bore. The cylindrical bore may be a generally straight cylindrical bore defined by generally straight cylindrical inner locating surfaces 50, as shown in FIGS. 7, 9, 11, 13, and 15, or a tapered bore defined by tapered inner locating surfaces 52, as shown in FIG. 5. The distance between the generally straight cylindrical inner locating surfaces 50, or the smallest distance between the tapered inner locating surfaces 52, is measured by a shank locator or locating diameter $D_2$ (shown in FIG. 4).

The surfaces defining the shank guide and locating portions 28 and 30 may be joined by a transitional surface 54. In a preferred embodiment of the invention, the transitional surface 54 is inclined obliquely relative to the central axis $A_1$ of the shank 16 and faces generally longitudinally toward the leading end of the receiving portion 20. The transitional surface 54 accommodates for the difference between the shank guide and locating diameters $D_1$ and $D_2$ (shown in FIG. 4).

Figure 11:
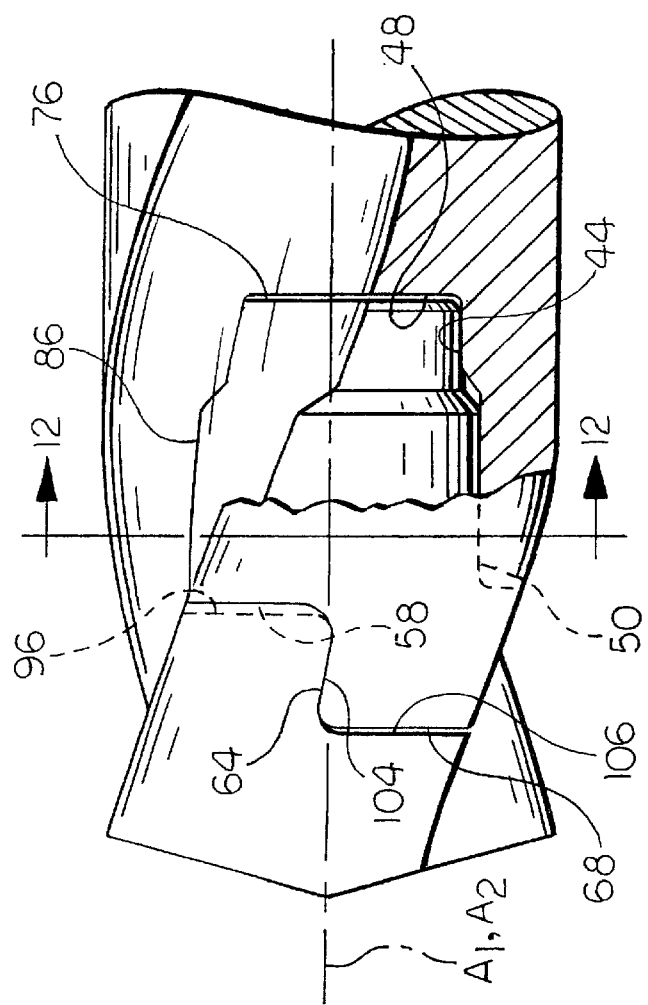
FIG. 11 is a sectional view in elevation of another rotary cutting tool of the invention.

The locating portion 30 terminates at a second radially extending surface located at the leading end of the locating portion 30. The second radially extending surface may be defined by a pair of radially extending surfaces 56, which extend perpendicularly to the central axis $A_1$ of the shank 16, as shown in FIGS. 5, 7, 9, 13, and 15, or radially extending surfaces 58, which are inclined obliquely relative to the central axis $A_1$ and face generally longitudinally toward the leading end of the shank 16, as shown in FIG. 11. The second radially extending surface may function as an axial stop surface in the place of the first radially extending surface described above.

Figure 9:
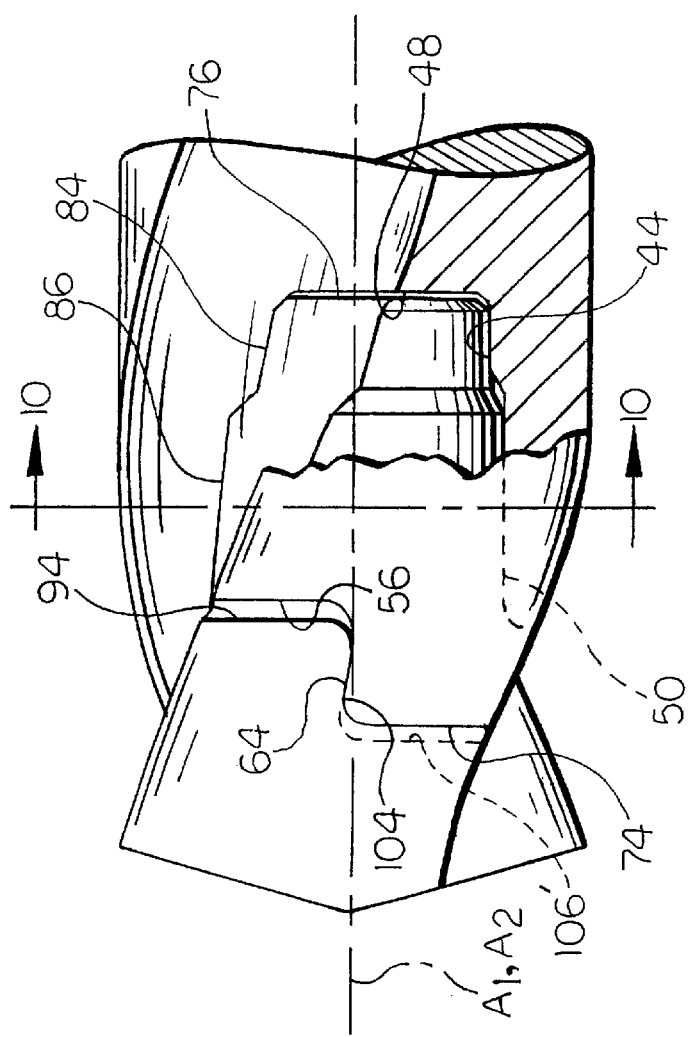
FIG. 9 is a sectional view in elevation of another rotary cutting tool of the invention.
Figure 12:
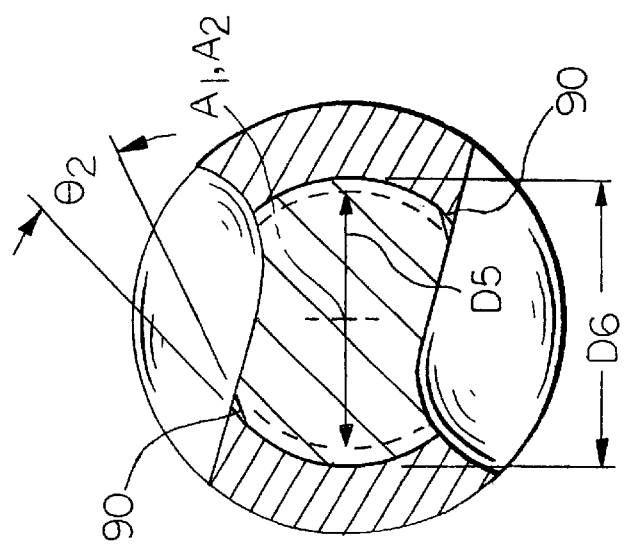
FIG. 12 is a cross-sectional view of the rotary cutting tool taken along the line 12—12 in FIG. 11.
Figure 15:
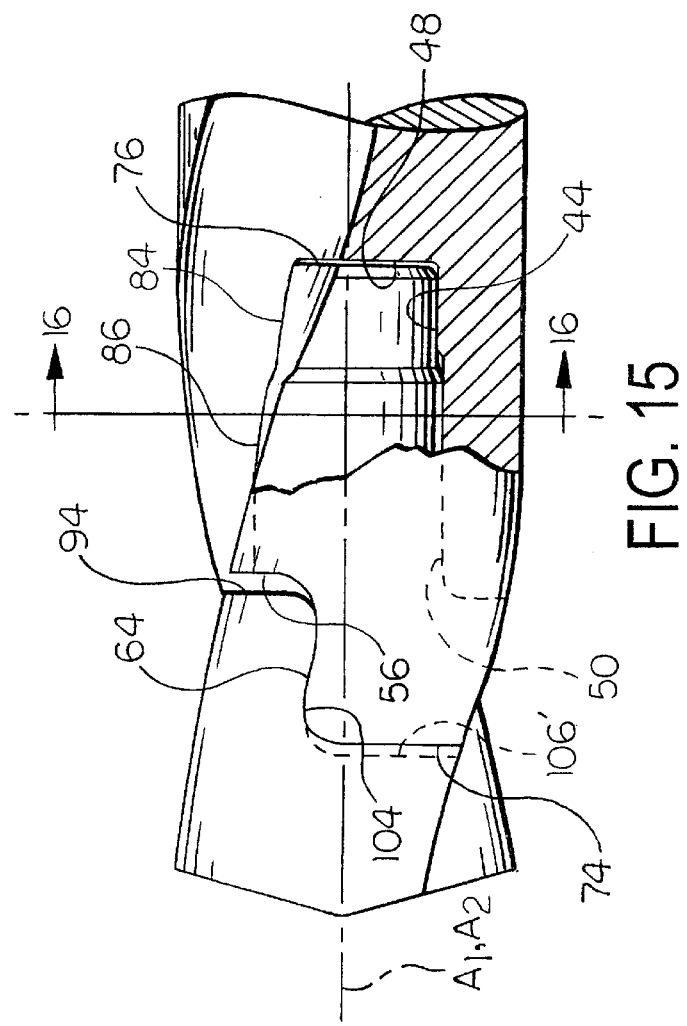
FIG. 15 is a sectional view in elevation of another rotary cutting tool of the invention.

The shank drive keys 32 are located at the leading end of the shank locating portion 30. In a preferred embodiment of the invention, the shank drive keys 32 have an axial profile dimension $D_3$ (shown in FIG. 5) and a radial profile dimension $D_4$ (shown in FIG. 4). The radial profile dimension $D_4$ is preferably smaller than the axial profile dimension $D_3$ to enable the shank drive keys 32 to be closely aligned with the central axis $A_1$ of the shank 16. The shank drive keys 32 are defined by an inner shank drive key surface 60, an outer shank drive key surface 62, a pair of circumferentially spaced, axially extending shank drive key surfaces 66 and 64, and a radially extending shank drive key surface, which may also be referred to as a third radially extending surface 68. The third radially extending surface 68 extends in a first direction between the inner and outer shank drive key surfaces 60 and 62 and in a second direction between the circumferentially spaced, axially extending shank drive key surfaces 66 and 64, all shown in FIG. 1. The inner shank drive key surface 60 may be coexistent with the inner shank locating surface. Similarly, the outer shank drive key surface 62 may be coexistent with an outer curved surface 70 of the shank 16. One of the circumferentially spaced, axially extending shank drive key surfaces 66 may define a flute, or a flute portion, through which particles of a workpiece may be discharged when the tool 10 is in use. The other circumferentially spaced, axially extending shank drive key surface 64 functions as a shank drive key radial stop surface, which is preferably disposed at an angle α (shown in FIG. 5) relative to a plane extending through the axis $A_1$ of the shank 16 and facing generally longitudinally toward the trailing end of the shank 16. In a preferred embodiment of the invention, the angle α is 15 degrees. The shank drive key radial stop surfaces 64 may be perpendicular relative to the inner and outer shank drive key surfaces 60 and 62, as shown in FIGS. 5, 9, 11, 13, and 15. Alternatively, shank drive key radial stop surfaces 72 may be provided which are inclined relative to the inner and outer shank drive key surfaces 60 and 62, as shown in FIG. 7. The third radially extending surface 68 may be perpendicular relative to the central axis $A_1$ of the shank 16, as shown in FIGS. 5, 7, 11, and 13. Alternatively, a third radially extending surface 74 may be provided which is inclined relative to the central axis $A_1$, as shown in FIGS. 9 and 15. Inclined axially or radially extending surfaces may reduce the risk that the shank drive keys 32 will spread apart. It should be appreciated that the third radially extending surface 68 may function as an axial stop surface in the place of the first and second radially extending surfaces described above.

The head guide portion 38 is preferably defined in part by an outer cylindrical surface, such as the outer guide surface 78 shown. The outer guide surface 78 is preferably a straight cylindrical surface having a head guide diameter $D_5$ (shown in FIGS. 4 and 6). The head guide portion 38 may also include a generally spherical outer radial surface 82, as shown in FIG. 5, adjacent its trailing end, or a conical outer radial surface 84, as shown in FIG. 7. In a preferred embodiment of the invention, the diameter of the conical surface 84 increases toward the leading end of the head guide portion 38. The trailing end of the head guide portion 38 may be defined by a first radially extending surface, which may also be referred to as a radially extending head guide surface. The first radially extending surface maybe an arcuate or spherical radial surface, which may coexist with the spherical outer radial surface 82, or a generally flat surface 76, as shown in FIGS. 7, 9, 11, 13, and 15, which extends generally perpendicularly to the axis $A_2$ of the head 18. The head guide portion 38 is adapted to engage the shank guide portion 28 and functions to stabilize the shank 16 and head 18 in radial direction when coupling the head 18 to the shank 16.

The head locating portion 36 is defined by an outer surface. The outer surface may be a generally straight cylindrical surface outer locating surface 86, as shown in FIGS. 7, 9, 11, 13, and 15. Alternatively, the outer surface may be a tapered outer locating surface 88, as shown in FIG. 5. The largest diameter of the outer surface is defined by the head locator or locating diameter $D_6$ (shown in FIGS. 4 and 6) and is slightly larger than the shank locating diameter $D_2$ (shown in FIG. 4). Consequently, the head locating portion 36 must be forced into the shank locating portion 30, causing the shank locating portion 30 to deflect outward, resulting in an interference fit between the two locating portions 30 and 36. It should be appreciated that a tapered outer locating surface 88 having a larger diameter at its leading end insures contact substantially with the entire shank locating portion 30, even when the shank locating portion 30 deflects outward. The increase in diameter $D_6$ is preferably measured by an angle of inclination $\beta$ (shown in FIG. 5) in the tapered outer locating surface 88 of less than one degree relative to a plane $P_1$ extending generally parallel to the central axis $A_1$.

Figure 14:
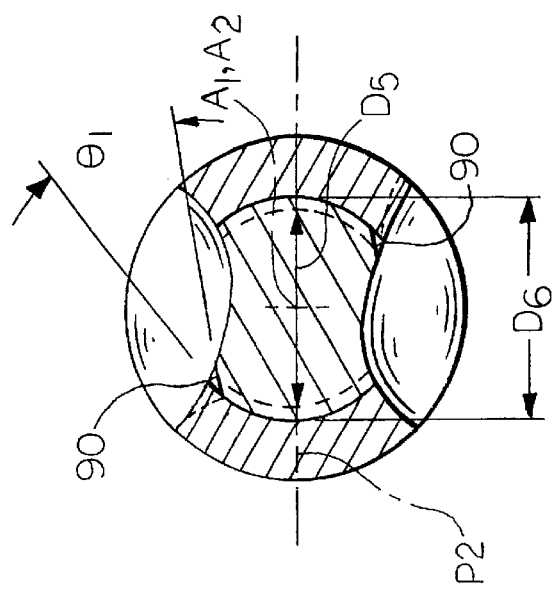
FIG. 14 is a cross-sectional view of the rotary cutting tool taken along the line 14—14 in FIG. 13.
Figure 13:
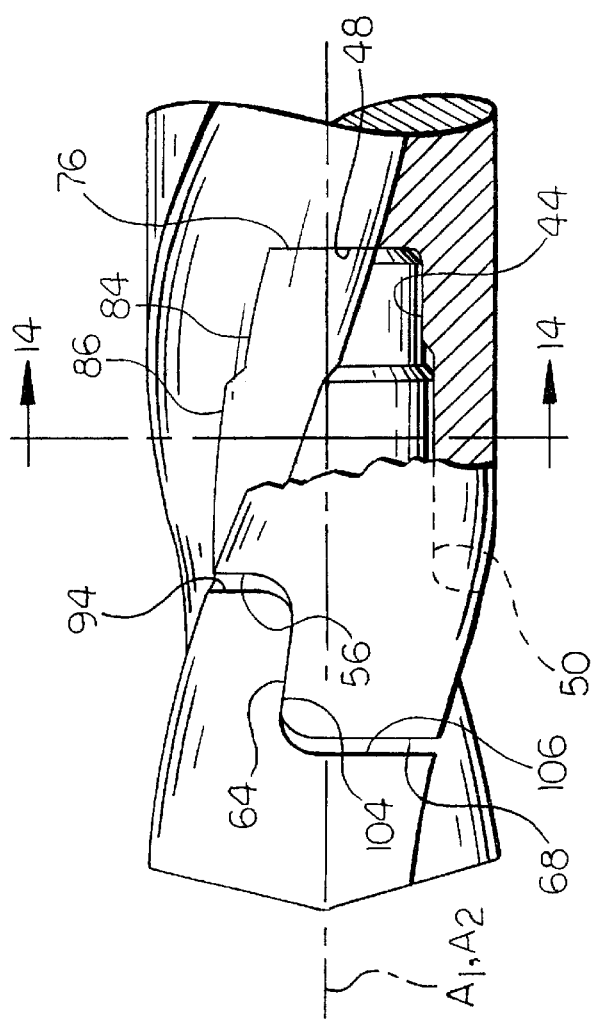
FIG. 13 is a sectional view in elevation of another rotary cutting tool of the invention.
Figure 16:
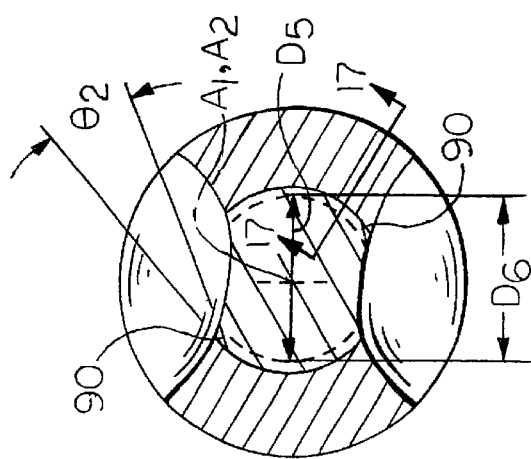
FIG. 16 is a cross-sectional view of the rotary cutting tool taken along the line 16—16 in FIG. 15.

The head locating portion 36 preferably has an axially extending angular lead surface 90 which provides clearance for an approaching portion of the head location portion 36 upon rotating the head 18 to couple the head 18 to the shank 16. The angle of the axially extending or angular lead surface 90 may vary. The angle is preferably in a range between 2 degrees and 20 degrees. For example, the angle $\theta_1$ of the lead surface 90 shown in FIG. 14 is 15 degrees relative to a line tangent to the outer locating surface at the intersection of the outer locating surface and the lead surface 90. The angle $\theta_2$ of the lead surface 90 shown in FIG. 6, 8, 10, 12, and 16 is 20 degrees.

Figure 4:
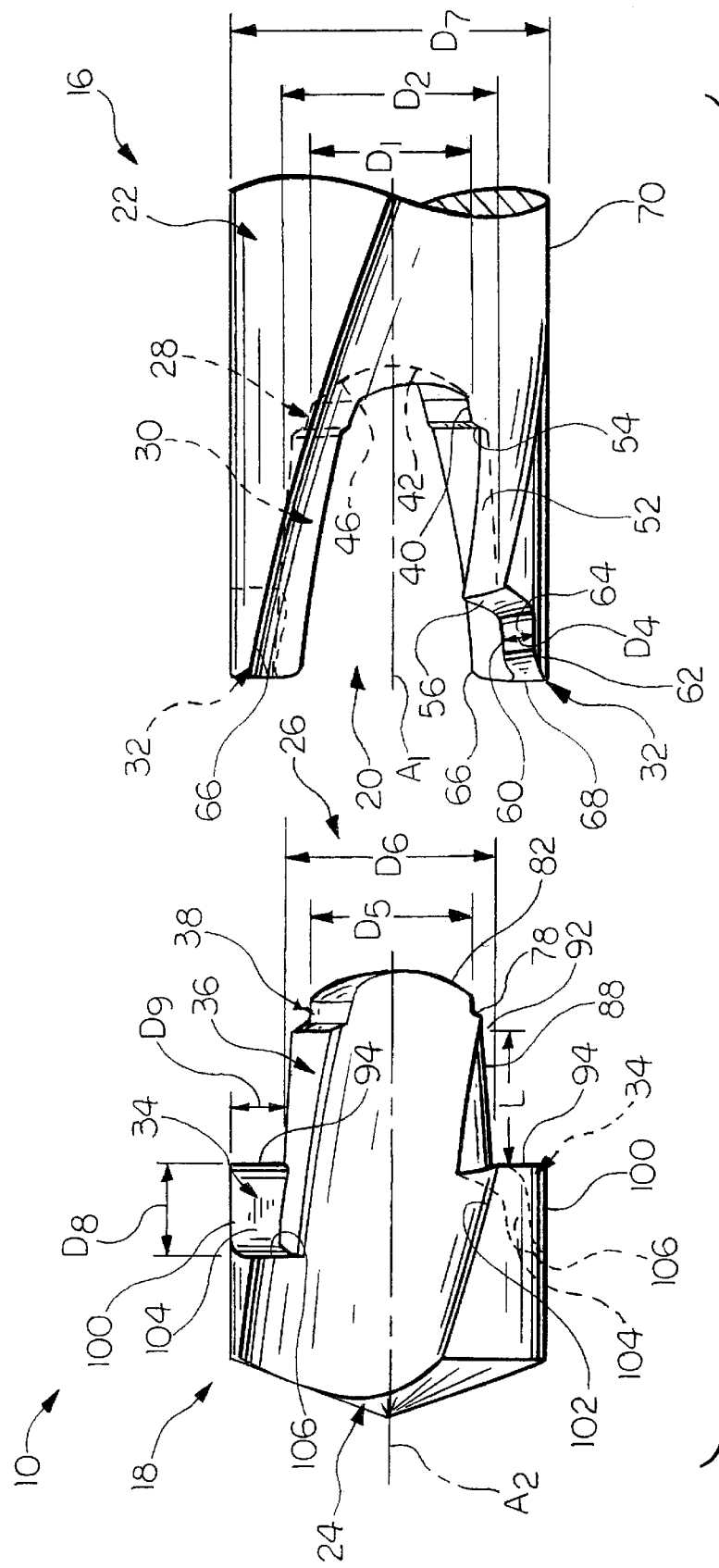
FIG. 4 is an exploded side elevational view of the rotary cutting tool shown in FIGS. 1–3.
Figure 5:
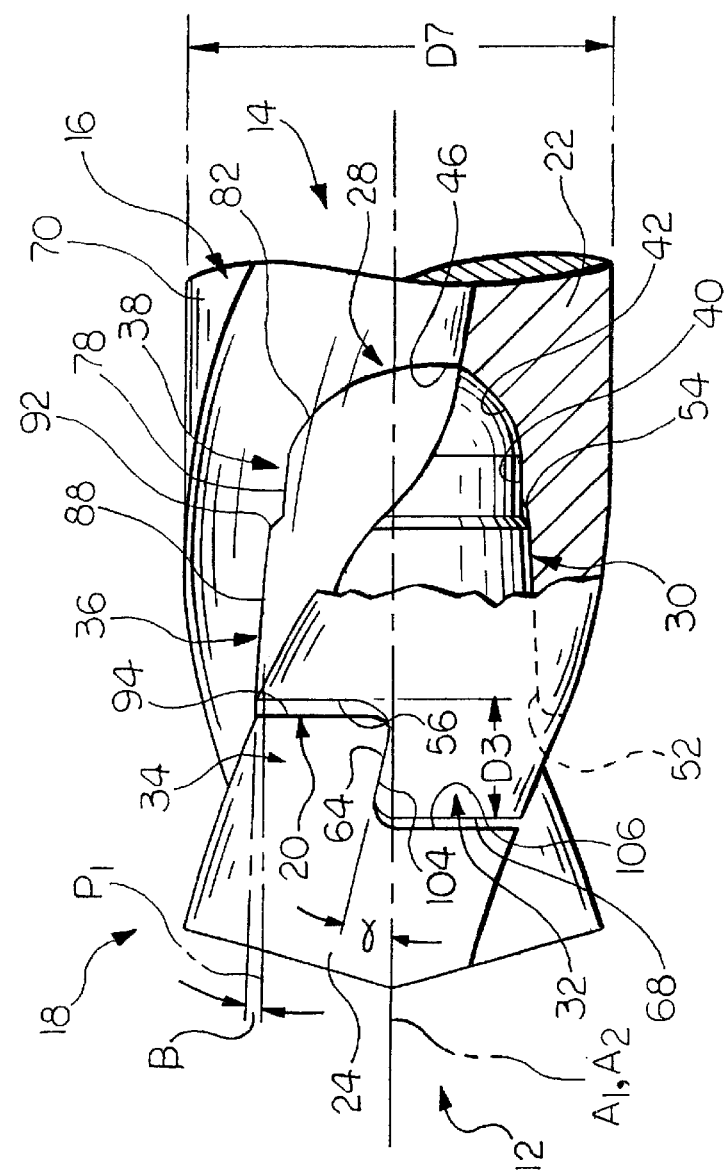
FIG. 5 is a sectional view in elevation of a rotary cutting tool of the invention.
Figure 8:
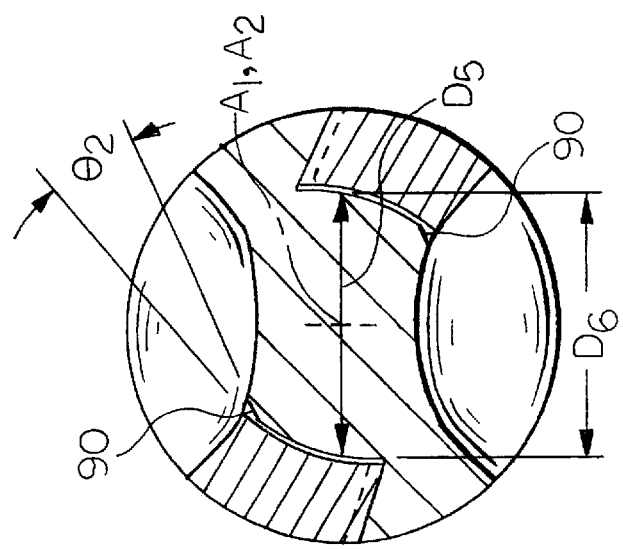
FIG. 8 is a cross-sectional view of the rotary cutting tool taken along the line 8—8 in FIG. 7.

In the preferred embodiment of the invention, the head locating portion 36 has a larger diameter $D_6$ (shown in FIGS. 4 and 6) that is more than half the cutting diameter $D_7$ of the tool 10 (shown in FIGS. 4 and 5). This is to establish a relationship between the locating diameter and the depth of the flute to insure proper assembly of the shank 16 and head 18. Moreover, the length of the head locating portion 36 is slightly less or more than the head locating diameter $D_6$ (shown in FIGS. 4 and 6). For example, a range for the length of the head locating portion 36 may be ¾ to 2 times the head locating diameter $D_6$. The length of the head locating portion 36 would be determined by the size of the tool 10. Larger tools would be in the ¾ to 1 ¼ range while smaller diameters could be up to 2 times the diameter.

Similar to the receiving portion 20 set forth above, the mounting portion 26 may be provided with a transitional surface 92. In a preferred embodiment of the invention, the transitional surface 92 is inclined obliquely relative to the central axis $A_2$ of the head 18 and faces generally longitudinally toward the trailing end of the mounting portion 26. The transitional surface 92 accommodates for the difference between the head guide and locating diameters $D_5$ and $D_6$ (shown in FIGS. 4 and 6).

The head locating portion 36 terminates at a second radially extending surface located at the leading end of the head locating portion 36. The second radially extending surface may be defined by a pair of radially extending surfaces 94, which extend perpendicularly to the central axis $A_2$ of the head 18, as shown in FIGS. 5, 7, 9, 13, and 15, or radially extending surfaces 96, which are inclined obliquely relative to the central axis $A_2$ and face generally longitudinally toward the trailing end of the head 18, as shown in FIG. 11.

Figure 17:
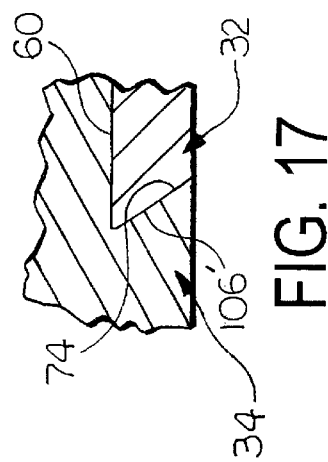
FIG. 17 is a sectional view of the taken along the line 17—17 in FIG. 16.

The head drive keys 34 are located at the leading end of the head locating portion 36. In a preferred embodiment of the invention, the head drive keys 34 have an axial profile dimension $D_8$ and a radial profile dimension $D_9$ (shown in FIG. 4). The radial profile dimension $D_9$ is preferably less than the head locating diameter $D_6$ (shown in FIGS. 4 and 6). Longer head drive keys 34 may result in a weaker connection between the shank 16 and the head 18. Moreover, the radial profile dimension $D_9$ is preferably smaller than the axial profile dimension $D_8$ to enable the head drive keys 34 to be closely aligned with central axis $A_2$ of the head 18. The head drive keys 34 are defined by an outer head drive key surface 100, circumferentially spaced, axially extending head drive key surfaces 102 and 104, and a radially extending head drive key surface, which may be referred to as a third radially extending surface 106 (all shown in FIG. 1). One of the axially extending head drive key surfaces 102 may define a portion of a flute. The other axially extending head drive key surface 104 functions as a head drive key radial stop surface, which is preferably disposed at an angle a relative to a plane $P_1$ extending through a central axis $A_2$ of the head 18 and facing generally longitudinally toward the leading end of the head 18, as shown in FIG. 5. In a preferred embodiment of the invention, the angle α is 15 degrees. The head drive key radial stop surfaces 104 may be perpendicular relative to the outer surface 100, as shown in FIGS. 5, 9, 11, 13, and 15. Alternatively, head drive key radial stop surfaces 108 may be provided which are inclined relative to the outer surface 100, as shown in FIG. 7. The head drive key radial stop surfaces 102 and 108 are adapted to fit in angular alignment with the shank drive key radial stop surfaces 64 and 72. The third radial surface 106 may be perpendicular relative to the central axis $A_2$. Alternatively, a third radially extending surface 106 may be provided which is inclined relative to the central axis $A_2$, as shown in FIGS. 9, 15, and 17.

In operation, the mounting portion 26 is adapted to be inserted axially into the receiving portion 20. Subsequently, the head 18 is twisted into a final radial location determined by the engagement of the shank drive keys 32 and 34.

It should be noted that the locating diameters $D_2$ and $D_6$ (shown in FIG. 4) must be larger than the guide diameters $D_1$ and $D_5$ (also shown in FIG. 4). Moreover, the guide diameters $D_1$ and $D_5$ should be sufficiently small enough to require the head guide portion 38 to be inserted axially into the shank guide portion 28. In this way, the guide portions 38 and 28 cooperatively act as a guide during rotation of the head 18. The drill flutes should be dimensioned so that the head guide portion 38 does not escape in the radial direction from the shank guide portion 28. By providing locating diameters $D_2$ and $D_6$ that are larger than guide diameters $D_1$ and $D_5$, the drill flutes may be dimensioned large enough to allow the mounting portion 26 to be inserted into the receiving portion 20 within the flutes. The head 18 may then be rotated 90 degrees with an assembly tool (not shown) that serves as a radial guide for the leading end of the shank 16 and the head 18.

The angular alignment of the drive key radial stop surfaces 64 and 72 provides retention of the head 18 during removal of the tool 10 from a work piece (not shown). Rotary cutting tools tend to drag during retraction. This drag creates a torsional moment on the head 18 as well as a force to separate the head 18 from the shank 16. The torsional moment, combined with the angular alignment of the drive keys 32 and 34, make it difficult for the head 18 to separate from the shank 16.

It should be appreciated that the shank 16 may include a mounting portion, such as that shown and described above, and the head 18 may include a receiving portion.

While this invention has been described with respect to several preferred embodiments, various modifications and additions will become apparent to persons of ordinary skill in the art. All such variations, modifications, and variations are intended to be encompassed within the scope of this patent, which is limited only by the claims appended hereto.

What is claimed is:

1. A rotary cutting tool comprising:
   a shank having a receiver comprising:
   a shank guide at a trailing end of the receiver;
   opposing shank drive keys at a leading end of the receiver; and
   a shank locator axially between the shank guide and the shank drive keys, the shank drive keys each comprising an axially extending shank drive key radial stop surface that is disposed at an angle relative to a plane extending through a central axes of the receiver; and
   a head having a connector comprising:
   a head guide at a trailing end of the connector;
   opposing head drive keys at a leading end of the connector; and
   a head locator portion axially between the head guide and the head drive keys, the head drive keys each comprising an axially extending head drive key radial stop surface that is disposed at an angle relative to a plane extending through a central axes of the connector, wherein each shank drive key radial stop surface is adapted to angularly align with a corresponding head drive key radial stop.

2. The tool of claim 1, wherein the guides have trailing ends defined by spherical surfaces.

3. The tool of claim 1, wherein the guides have leading ends and trailing ends, the trailing ends of the guides being defined by conical surfaces that increase in diameter toward the leading ends of the guides.

4. The tool of claim 1, further including a transitional surface between the guides and the locators.

5. The tool of claim 4, wherein the transitional surfaces are inclined relative to the central axes of the receiver and connector.

6. The tool of claim 1, wherein the locators are defined by tapered surfaces.

7. The tool of claim 1, wherein the shank locator is defined by a straight cylindrical bore and head locator is defined by a straight cylinder.

8. The tool of claim 1, wherein the shank locator is defined by a straight cylindrical bore and head locator is defined by a tapered surface that is inclined relative to the central axis of the connector an angle of inclination so a leading end of the head locator is larger than a trailing end of the head locator.

9. The tool of claim 8, wherein the angle of inclination is less than one degree.

10. The tool of claim 1, wherein the head locator portion further includes an axially extending lead surface.

11. The tool of claim 10, wherein the axially extending lead surface is disposed at an angle ranging between 2 degrees and 20 degrees relative to a line tangent to the locating diameter.

12. The tool of claim 1, wherein the shank and head locators are respectively defined shank and head locating diameters and the shank and head drive keys each have a length that is less than the shank and head locating diameters, respectively.

13. The tool of claim 12, wherein the locating diameters are more than one-half the shank diameter.

14. The tool of claim 1, wherein the shank and head drive keys each has a radial profile and an axial profile that is longer than the radial profile.

15. The tool of claim 1, wherein the angle of each drive key radial stop surfaces is 15 degrees.

16. The tool of claim 1, wherein each drive key radial stop surface is radially inclined.

17. The tool of claim 1, wherein each drive key further includes an inclined radially extending surface.

18. The tool of claim 1, wherein the receiver and connector are cooperatively structured and dimensioned so that the connector is adapted to be inserted axially into the receiver and then twisted into a final radial location determined by the position of the drive keys.

19. A rotary cutting tool comprising:
   a shank having a central axis, a leading end, a trailing end, an outer surface defining a shank diameter, and a receiving portion at the leading end, the receiving portion comprising:
   a shank guide portion having a leading end and a trailing end, the shank guide portion being defined by a pair of inner shank guide surfaces radially spaced apart by a shank guide diameter, the shank guide further being defined by a radially extending shank guide surface at the trailing end of the shank guide portion;
   a shank locating portion having a leading end and a trailing end, the shank locating portion being defined by a pair of radially spaced inner locating surfaces originating adjacent the leading end of the shank guide portion and extending away from the shank guide portion toward the leading end of the shank, the inner locating surfaces being spaced apart by a locating diameter that is larger than the shank guide diameter, the inner locating surfaces terminating at a radially extending shank locating surface at the leading end of the shank locating portion, the radial shank locating surface extending radially outward from the leading end of each of the inner locating surfaces; and
   a shank drive key extending axially from the leading end of each of the inner locating surfaces, each shank drive key comprising an inner shank drive key surface, an outer shank drive key surface, opposing axially extending shank drive key surfaces, and a radially extending shank drive key surface, the inner and outer shank drive key surfaces extending between the opposing axially extending shank drive key surfaces, the radially extending shank drive key surfaces extending in a first direction between the inner and outer shank drive key surfaces and in a second direction between the opposing axially extending shank drive key surfaces; and
   a head having a central axis, a leading end, a trailing end and a mounting portion at the leading end of the head, the mounting portion comprising:

a head guide portion having a leading end and a trailing end, the head guide portion being defined by a pair of head guide surface-radially spaced apart by a head guide diameter, the head guide further being defined by a radially extending head guide surface at the trailing end of the head guide portion;

a head locating portion having a leading end and a trailing end, the head locating portion be defined by a pair of radially spaced outer locating surfaces originating adjacent the leading end of the head guide portion and extending away from the head guide portion toward the leading end of the head, the outer locating surfaces being spaced apart by a head locating diameter that is larger than the head guide diameter and larger than the shank locating diameter, the outer locating surfaces terminating at a radially extending head locating surface the leading end of the head locating portion, the radially extending locating surface extending radially outward from the leading end of each of the outer locating surfaces; and a head drive key extending axially from the trailing end of each of the outer locating surfaces, each head drive key comprising an outer head drive key surface, opposing axially extending head drive key surfaces, and a radially extending head drive key surface, the radially extending head drive key surface extending between the opposing axially extending head drive key surfaces, wherein one of the radially extending surfaces of the receiving portion is an axial stop surface, one of the radially extending surfaces of the mounting portion is an axial stop surface that cooperates with the axial stop surface of the receiving portion, one of the axially extending surfaces of each shank drive key is a radial stop surface, and one of the axially extending surfaces of each head drive key is a radial stop surface that cooperates with an axial stop surface of a corresponding one of the shank drive keys, each shank drive key radial stop surface being adapted to angularly align with a corresponding head drive key radial stop, each drive key radial stop surface being disposed at an angle relative to a plane extending through the central axis of the shank and head.

20. The tool of claim 19, wherein the inner shank guide surface and the outer head guide surface are cylindrical.

21. The tool of claim 20, wherein the radially extending shank guide surface and the radially extending head guide surface are spherical.

22. The tool of claim 21, wherein the radially extending shank guide surface and the radially extending head guide surface are conical and increase in diameter toward the leading end of the shank and head, respectively.

23. The tool of claim 19, further including a shank transitional surface between the shank guide portion and the shank locating portion and a head transitional surface between the head guide portion and the head locating portion.

24. The tool of claim 23, wherein the shank transitional surface is inclined relative to the central axis of the shank and the head transitional surface is inclined relative to the central axis of the head.

25. The tool of claim 19, wherein each one of the outer locating surfaces is defined by a straight cylindrical bore.

26. The tool of claim 19, wherein the radially extending shank locating surfaces and the radially extending head locating surfaces are inclined relative to the central axis of the shank and head, respectively.

27. The tool of claim 19, wherein the shank and head drive keys each has a length that is less than the shank and head locating diameter, respectively.

28. The tool of claim 19, wherein the shank and head drive keys all have a radial profile and an axial profile that is longer than the radial profile.

29. The tool of claim 19, wherein the angle is 15 degrees.

30. The tool of claim 19, wherein each drive key radial stop surface is perpendicular relative to the inner and outer drive key surfaces.

31. The tool of claim 19, wherein each drive key radial stop surface is inclined relative to the inner and outer drive key surfaces of corresponding drive keys.

32. The tool of claim 19, wherein the radially extending shank drive key surfaces and the radially extending head drive key surfaces are inclined relative to the central axes of the shank and head, respectively.

33. The tool of claim 19, wherein the outer head locating surfaces are inclined relative to the central axis of the head at an angle of inclination so the leading end of the head locating portion is larger than the trailing end of the head locating portion.

34. The tool of claim 33, wherein the angle of inclination is less than one degree.

35. The tool of claim 19, wherein the head location portion further includes an angular lead surface extending axially adjacent to each of the outer locating surfaces.

36. The tool of claim 35, wherein each angular lead surface is disposed at an angle ranging between 2 degrees and 20 degrees relative to a line tangent to the locating diameter.

37. The tool of claim 19, wherein the locating diameters are more than one-half the shank diameter.

38. The tool of claim 19, wherein the receiving and mounting portions are cooperatively structured and dimensioned so that the mounting portion is adapted to be inserted axially into the receiving portion and then twisted into a final radial location determined by the position of the drive keys.

* * * * *